(No Model.)
W. D. SMITH.
CAR WHEEL.
No. 303,064. Patented Aug. 5, 1884.
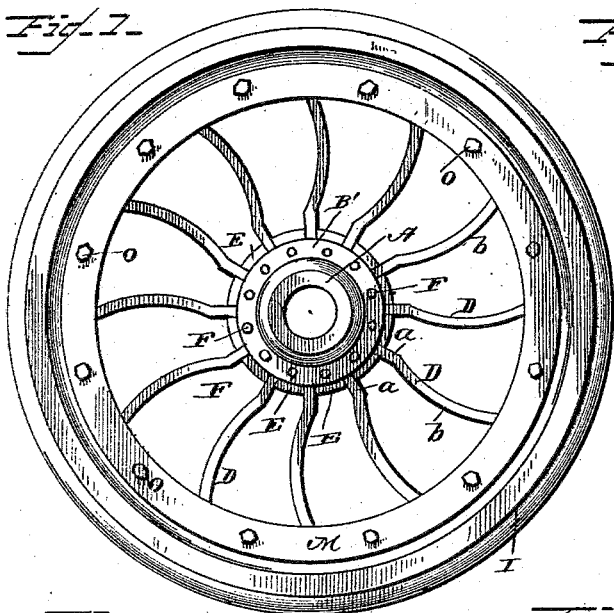
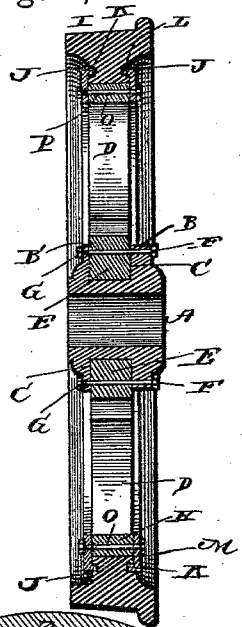
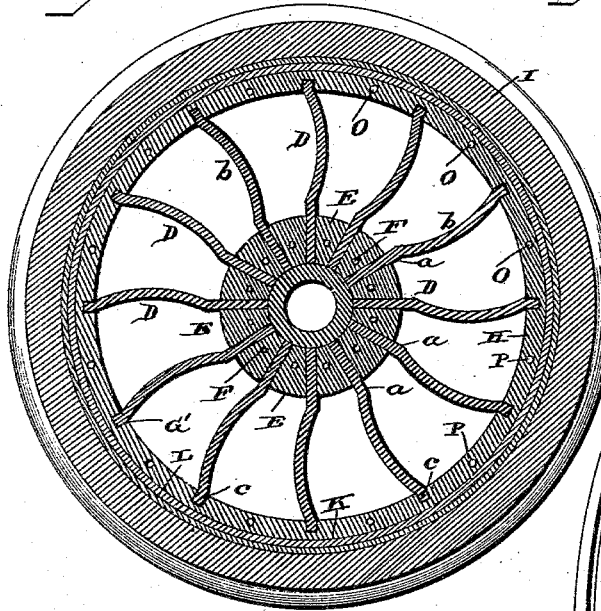
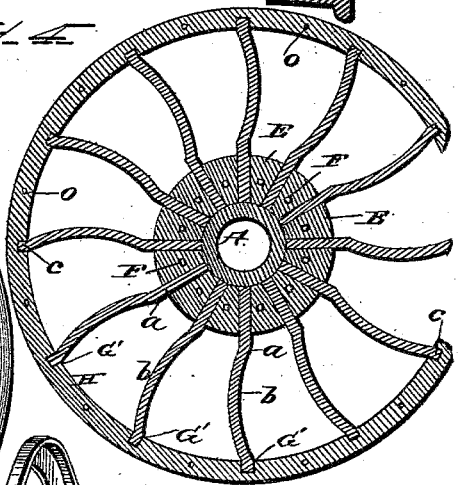
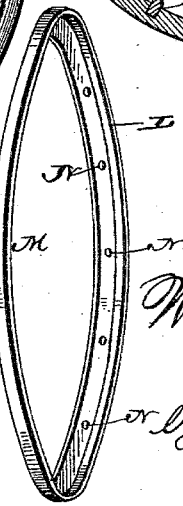
WITNESSES
Franck L. Ourand.
Edward G. Siggers.
W. D. Smith
INVENTOR
by C. A. Snow & Co.
Attorneys

UNITED STATES PATENT OFFICE.

WALTON DUANE SMITH, OF PROPHETSTOWN, ILLINOIS, ASSIGNOR OF ONE-HALF TO WALTER E. ROSE, OF SAME PLACE.

CAR-WHEEL.

SPECIFICATION forming part of Letters Patent No. 303,064, dated August 5, 1884.

Application filed May 14, 1884. (No model.)

*To all whom it may concern:*

Be it known that I, WALTON D. SMITH, a citizen of the United States, residing at Prophetstown, in the county of Whiteside and State of Illinois, have invented a new and useful Car-Wheel, of which the following is a specification, reference being had to the accompanying drawings.

This invention relates to car-wheels, and it has for its object to provide a slightly elastic wheel in which there will be no shrinkage-strains of a nature inherent in all cast wheels, and if the tire is ruptured while in use it will not come off, and thus accidents will be avoided.

With these and other objects in view the said invention consists in certain details of construction and combination of parts, as hereinafter set forth, and particularly pointed out in the claims.

In the accompanying drawings, Figure 1 is a side view of a car-wheel embodying my improvements. Fig. 2 is a transverse sectional view of the same. Fig. 3 is a longitudinal section of the same. Fig. 4 is a longitudinal section of the wheel before the outer tire and retaining-rings are placed in position. Fig. 5 is a detail perspective view of one of the retaining-rings.

Like letters refer to corresponding parts in the several figures.

Referring to the drawings, A designates the hub of the car-wheel, constructed in any suitable manner, and formed with annular flanges or shoulders B B', providing a space, C, between the shoulders, the wheel arms or spokes D D being set around the hub in this space. Wedge-shaped blocks E E are also arranged in this space between each of the arms or spokes, headed bolts F F passing through the flanges or shoulders and blocks, and holding the same in position by means of nuts G G.

The wheel arms or spokes D are preferably constructed of the shape shown in the drawings, the lower portion for about one-third of their length being formed straight, as shown at *a*, and curving outward from that point, as at *b*, the outer ends, *c*, extending out at an angle from this curved portion and entering recesses G' G' formed in the inner face of the inner tire, H.

It will be seen that by this manner of holding the wheel-arms in place, and by the slight curvature of the arms, there will be sufficient elasticity to withstand all the strains of constant use. The wheels are not bolted in place; but the bolts hold the wedge-shaped blocks in the space between the flanges or shoulders of the hub, and these blocks, being interposed between each of the arms, serve to hold the same firmly in position. Since the outer ends of the wheel-arms are placed in the recesses of the inner tire, and the inner ends are held in place by the wedge-shaped blocks in the manner hereinbefore described, the arms will, by means of their curvature, give elasticity to the wheel, and thus make the latter more efficient and durable in use.

I designates the outer tire of the wheel, formed on its outer face with the usual flange and tread portion, the sides of the outer tire being cut away, as at J, and an annular recess, K, being formed in the cut-away portion of the sides, to receive the inwardly-turned flanges L formed on the periphery of the retaining-rings M. Said rings are circular in form, as shown, and are provided with a series of holes, N N, bolts O being passed through the holes N, and also through holes P P, formed at intervals around the inner tire, H, suitable nuts being employed to hold the bolts in place. It will be seen that the retaining-rings hold the outer tire from coming off, the inner face of the outer tire abutting against the outer face of the inner tire, the retaining-rings resting flat against the adjacent ends of the two tires and serving to hold the parts securely in their proper places, and should the tire become ruptured there will be no danger of it coming off, as the retaining-rings will still hold it in place.

The operation of my invention will be readily understood from the foregoing description, taken in connection with the annexed drawings. In putting up the wheel the arms or spokes are first set in the space between the flanges or shoulders of the hub, a sufficient space being left between the arms at their inner ends to provide room for the wedge-shaped blocks, which are driven down into the space C between each wheel arm or spoke. The bolts F are then passed through the flanges or shoulders and through holes formed in the blocks, the nuts G being screwed onto the ends of the bolts, and thus the blocks and the inner ends of the arms will be held securely in place. After the arms have been properly fitted in the hub, the arms are then contracted by means of compression brought to bear on their outer ends by simple machinery and acting toward the center of the hub until sufficient contraction is reached to admit of the hub and arms being placed into the inner tire, H, the outer ends of the arms resting in the recesses of the same, the wheel being then in condition to receive the outer tire, I, which, being slightly smaller in its inside diameter than the diameter of the hub, arms, and inner tire, said outer tire is expanded by heat and shrunk onto the wheel in the usual manner. The retaining-rings are then placed on each side of the wheel, the flanges L of said rings entering the annular recesses K formed in the cut-away sides of the outer tire, I, and the bolts O being passed through the holes N N of the rings and the holes P P of the inner tire, suitable nuts being employed to hold the bolts in their proper places, so as to prevent the rings from coming off.

It will be apparent that by reason of the inside edge of the retaining-rings coming flush with the inner face of the inner tire and inner portion of the outer tire the outer tire will not be thrown out of place should it become ruptured in any way, while the arms will be prevented from slipping sidewise out of the recesses in the inner tire.

My improved car-wheel will be sufficiently elastic in its nature to sustain the wear and tear of use, and there will be no shrinkage-strains such as are due to unequal contraction in all cast-metal wheels. The outer tire, or tire proper, will not come off unless the retaining-rings are broken, and as said rings are not subjected to any strains, the breaking of the same is highly improbable.

My improved car-wheel is simple, durable, inexpensive, and efficient, and will prove of great utility for the purposes intended.

Having described my invention, I claim—

1. In a car-wheel, the combination, with the hub, of the curved spring-arms, fitted at their lower ends in the hub, and the inner tire detachably fitted over the outer ends of the arms, as set forth.

2. In a car-wheel, the combination, with the flanged hub, of the spring-arms fitting between the flanges of the hub, wedge-shaped blocks interposed between each of the arms, bolts passing through the blocks and flanges so as to hold the blocks in place, and thus prevent the dislodgment of the arms, and the inner tire provided with recesses to receive the ends of the arms, as set forth.

3. In a car-wheel, the outer tire having its sides cut away, as at J, and an annular recess or groove in the sides, in combination with the inner tire, spokes, and hub, and retaining-rings formed with flanges to fit in the recesses or grooves of the outer tire, and bolts passing through the inner tire and securing the rings against the face of the outer and inner tires, as set forth.

4. In a car-wheel, the combination, with the flanged hub, of the spokes or arms fitting between the flanges of the hub, wedge-shaped blocks interposed between each of the arms, the inner tire having recesses to receive the outer ends of the arms, the outer tire formed with annular grooves in its sides, the retaining-rings formed with inwardly-turned flanges to enter the grooves of the outer tire, and bolts passing through the inner tire and holding the rings in place, as set forth.

5. In a car-wheel, the combination, with the inner tire formed with recesses, and the wheel-arms having their outer ends entering the recesses, of the outer tire and the retaining-rings connecting the outer and inner tires, as set forth.

In testimony that I claim the foregoing as my own I have hereto affixed my signature in presence of two witnesses.

WALTON DUANE SMITH.

Witnesses:
 CYRUS EMORY,
 JAMES O. R. CARLEY.